(12) United States Patent
Kim et al.

(10) Patent No.: US 11,920,719 B2
(45) Date of Patent: Mar. 5, 2024

(54) HEATER SYSTEM FOR PIPE

(71) Applicant: TSC INC., Hwaseong-si (KR)

(72) Inventors: Oh Su Kim, Suwon-si (KR); John Ho Kuk, Osan-si (KR)

(73) Assignee: TSC INC., Hwaseong-si (KR)

( * ) Notice: Subject to any disclaimer, the term of this patent is extended or adjusted under 35 U.S.C. 154(b) by 515 days.

(21) Appl. No.: 17/119,098

(22) Filed: Dec. 11, 2020

(65) Prior Publication Data

US 2022/0010909 A1   Jan. 13, 2022

(51) Int. Cl.
*F16L 53/38* (2018.01)

(52) U.S. Cl.
CPC ..................... *F16L 53/38* (2018.01)

(58) Field of Classification Search
CPC . F16L 53/38; F16L 53/35; H05B 1/02; H05B 3/06; H05B 3/18; H05B 3/40
See application file for complete search history.

(56) References Cited

U.S. PATENT DOCUMENTS

| 4,287,245 A | * | 9/1981 | Kikuchi | F16L 59/024 428/317.5 |
| 2019/0382119 A1 | * | 12/2019 | Linde | B64D 15/12 |

FOREIGN PATENT DOCUMENTS

| KR | 10-1602127 B1 | 3/2016 | |
| KR | 10-2014114 B1 | 8/2019 | |
| WO | WO-2007118156 A2 * | 10/2007 | ............. G05D 23/19 |

* cited by examiner

*Primary Examiner* — Dana Ross
*Assistant Examiner* — Joe E Mills, Jr.
(74) *Attorney, Agent, or Firm* — Finch & Maloney PLLC

(57) ABSTRACT

A heater system for a pipe for controlling a temperature of a heater installed to surround a pipe and performing a heating or insulation function.

17 Claims, 12 Drawing Sheets

HEATER SYSTEM FOR PIPE

CROSS REFERENCE TO RELATED APPLICATION

This application claims the benefit of Korean Patent Application No. 10-2020-0085884, filed on Jul. 13, 2020, entitled "Heater System for Pipe", which is hereby incorporated by reference in its entirety into this application.

BACKGROUND

Field

The present disclosure relates to a heater system for a pipe, and more particularly, to a system for controlling a temperature of a heater installed to surround a pipe and performing a heating or insulation function.

Description of the Related Art

By-products accumulated on an inner wall of a pipe need to be prevented from sticking or temperature loss needs to be compensated for by heating a pipe that is operatively associated with coating of a chemical material, a deposition facility, or semiconductor fabrication facility at an appropriate temperature, and to this end, a heater system for a pipe, which surrounds the pipe and performs a heating or insulation function, has been created and used.

In the specification, assuming that a heater for a pipe is installed at the pipe, an inner surface refers to a surface close to the pipe and an outer surface refers to a surface distant from the pipe.

FIG. 9 is a perspective view of a conventional heater system for a pipe. FIG. 10 is a cross-sectional view of a conventional heater system for a pipe.

As shown in the drawings 9 and 10, the conventional heater system for a pipe includes a heater body part 110 configured in the form of a straight pipe to have an inner surface with a circular section, three heating lines 121 installed in the heater body part 110, and a confinement and manipulation part 130 installed in the heater body part 110.

The heater body part 110 may include an insulation layer part 115, a support layer part 116 installed inside the insulation layer part 115, an outer coating 117 installed on an outer surface of the insulation layer part 115, and an inner coating 118 installed on an inner surface of the support layer part 116.

The insulation layer part 115 may be embodied as Aramid Felt or the like.

The support layer part 116 may be famed of a heat-resistant material such as glass fiber cloth.

The outer coating 117 and the inner coating 118 may be formed of an insulating material such as polytetrafluoroethylene (PTFE).

One longitudinal cutting line 111 may be formed over an entire longitudinal section of the heater body part 110.

The longitudinal cutting line 111 may be formed straight from the outer surface of the heater body part 110 to the inner surface.

A pair of longitudinal cutting planes 112 may be formed over an entire longitudinal section of the heater body part 110 by the longitudinal cutting line 111.

Each of the longitudinal cutting planes 112 may be formed in a long rectangular plane positioned in a thickness direction of the heater body part 110.

Each of the heating lines 121 may be installed to expose opposite ends thereof out of the heater body part 110.

Each of the heating lines 121 may be fixed to the support layer part 116 by a sewing thread (not shown) of a heat-resistant material such as silica.

The confinement and manipulation part 130 may have a female velcro tape 132 and a male velcro tape 131 that are installed on the outer coating 117 adjacently to the longitudinal cutting planes 112.

However, in the conventional heater system for a pipe, the longitudinal cutting planes 112 foamed on the heater body part 110 by the longitudinal cutting line 111 is formed in a long rectangular plane positioned in the thickness direction of the heater body part 110, and thus there is a problem in that heat loss increases between the one pair of longitudinal cutting planes 112. Here, heat loss increases because a contact area between the one pair of longitudinal cutting planes 112 is reduced due to a small size of each longitudinal cutting plane 112 when confined by the confinement and manipulation part 130, and heat easily moves between the one pair of longitudinal cutting planes 112 since there is no bent portion on the longitudinal cutting plane 112.

When heat loss increases between the one pair of longitudinal cutting planes 112, the uniformity of the temperature of an outer surface of a pipe 201 may be degraded. When the temperature uniformity of the outer surface of the pipe 201 is degraded, there is a problem in that by-products stick on a partial region of an inner wall of the pipe (a region adjacent to the longitudinal cutting plane).

In addition, when heat loss between the one pair of longitudinal cutting planes 112 increases, there is a problem in that it is difficult to install the heating lines 121 adjacently to the longitudinal cutting planes 112.

FIG. 11 is a diagram showing the state in which a heater body part is divided of another conventional heater system. FIG. 12 is a control block diagram of another conventional heater system for a pipe.

The heater body part of another conventional heater system may be divided into nine pieces. Hereinafter, for convenience of description, each divided piece of the heater body part 110 will be referred to as a heater body split part 110'.

A temperature sensor 124 may be installed one by one on the heater body split part 110'. The temperature sensor 124 may be embodied using a thermocouple.

A controller 123a may be installed one by one in the heater body split part 110'.

Each controller 123a may control a power source (not shown) to maintain the temperature of the heater body split part 110' at a preset target temperature value based on a detection value of the temperature sensor 124.

However, another conventional heater system has a problem in that a control operation with respect to each heater body split part 110' is complex because each controller 123a independently performs control to maintain the preset target temperature irrespective of whether the heating operation of the adjacent heater body split part 110' stops.

The cited reference includes Korean Patent Publication No. 10-1602127 (Registered on: Mar. 4, 2016, Title of Invention: Heater System for Pipe) and Korean Patent Publication No. 10-2014114 (Registered on: Aug. 20, 2019, Title of Invention: Flat-type Heater Device Appropriate for Plurality of Planar Zones).

Korean Patent Publication No. 10-1602127 discloses a technology related to the aforementioned conventional heater system for a pipe having a heater body part that is not divided, and Korean Patent Publication No. 10-2014114 discloses the aforementioned heater system having a heater body part that is divided into a plurality of pieces.

SUMMARY

An object of the present disclosure is to provide a heater system for a pipe for maintaining a target temperature value in a pipe in the remaining region except for an installation region of a heater body split part, a heating operation of which is stopped, using a simple control operation on each heater body split part.

According to an exemplary embodiment of the present disclosure, a heater system for a pipe includes a heater body part including a plurality of heater body split parts on which a longitudinal cutting plane and a circumferential cutting plane are formed, a heating line installed for each of the heater body split parts, a power source connected in parallel to the heating line, a confinement and manipulation part configured to confine the heater body part in a cylindrical form, a plurality of temperature sensors installed in the heater body split parts, respectively, and configured to generate measured temperature information, and a control module configured to control the power source depending on a measured temperature value from each of the temperature sensors, wherein the control module includes a memory configured to store reference temperature information and first failure current compensation information, and a controller configured to compare the reference temperature information stored in the memory with the measured temperature information, and to control the power source to adjust an internal temperature of the heater body part based on the first failure current compensation information when the measured temperature information is lower than the reference temperature information.

The memory may additionally store second failure current compensation information, and the controller may control the power source based on the first failure current compensation information to heat the heating line and to guide an increase in a temperature inside the heater body part, and then, control the power source to additionally heat the heating line based on the second failure current compensation information when information on the increased temperature is lower than the reference temperature information.

The control module may further include an alert unit, and the controller may control the alert unit to operate when the measured temperature value is lower than the reference temperature information.

The longitudinal cutting plane may include a longitudinal external cutting region disposed in a thickness direction from an outer surface, a longitudinal intermediate cutting region extending in a circumferential direction of the heater body part from the longitudinal external cutting region, and a longitudinal internal cutting region extending to reach an inner surface of the heater body part in the thickness direction of the heater body part from the longitudinal intermediate cutting region, and the circumferential cutting plane may include a circumferential external cutting region disposed in the thickness direction from the outer surface, a circumferential intermediate cutting region extending in a longitudinal direction of the heater body part from a circumferential external cutting region, and a circumferential internal cutting region extending to reach the inner surface of the heater body part in the thickness direction of the heater body part from the circumferential intermediate cutting region.

The confinement and manipulation part may be installed in the longitudinal intermediate cutting region.

The confinement and manipulation part may include a female velcro tape and a male velcro tape that are installed to face each other in the longitudinal intermediate cutting region.

The heating line may be installed more inwardly than the longitudinal intermediate cutting region.

The heater body split parts may be formed of a flexible material.

The control module may group the heating lines of the heater body split parts in a longitudinal direction or a column direction and may control the heating lines to operate.

According to another exemplary embodiment of the present disclosure, a heater system for a pipe includes a heater body part including a plurality of heater body split parts on which a longitudinal direction cutting plane is formed, a heating line installed for each of the heater body split parts, a power source connected in parallel to the heating line, a confinement and manipulation part configured to confine the heater body part in a cylindrical form, a plurality of temperature sensors installed in the heater body split parts, respectively, and configured to generate measured temperature information, and a plurality of control modules configured to control the power source depending on a measured temperature value from each of the temperature sensors, each of the plurality of control modules includes a memory configured to store reference temperature information and first failure current compensation information, and a controller configured to compare the reference temperature information stored in the memory with the measured temperature information, and to control the power source to adjust an internal temperature of the heater body part based on the first failure current compensation information when the measured temperature information is lower than the reference temperature information.

The memory may additionally store second failure current compensation information, and the controller may control the power source based on the first failure current compensation information to heat the heating line and to guide an increase in a temperature inside the heater body part, and then, controls the power source to additionally heat the heating line based on the second failure current compensation information when information on the increased temperature is lower than the reference temperature information.

The control module may further include an alert unit, and the controller may control the alert unit to operate when the measured temperature value is lower than the reference temperature information.

The longitudinal cutting plane may include a longitudinal external cutting region disposed in a thickness direction from an outer surface, a longitudinal intermediate cutting region extending in a circumferential direction of the heater body part from the longitudinal external cutting region, and a longitudinal internal cutting region extending to reach an inner surface of the heater body part in the thickness direction of the heater body part from the longitudinal intermediate cutting region.

The confinement and manipulation part may be installed in the longitudinal intermediate cutting region.

The confinement and manipulation part may include a female velcro tape and a male velcro tape that are installed to face each other in the longitudinal intermediate cutting region.

The heating line may be installed more inwardly than the longitudinal intermediate cutting region.

DETAILED DESCRIPTION

Figure 1:
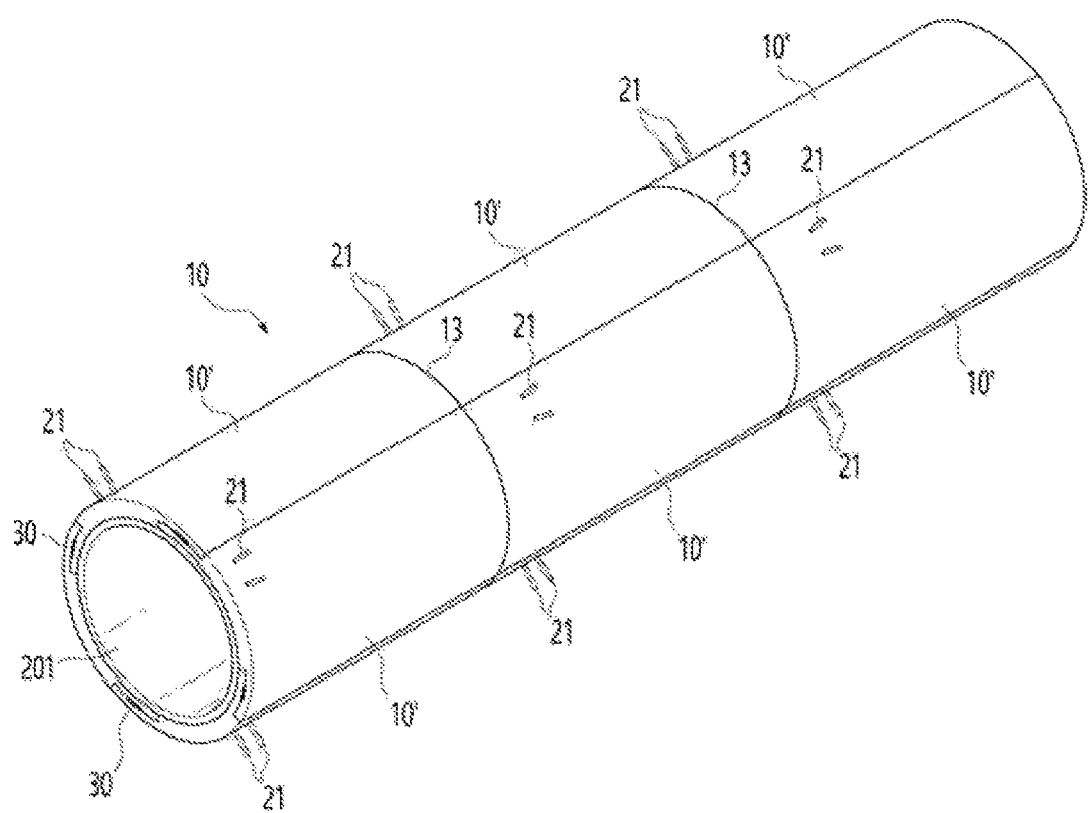
FIG. 1 is a diagram showing the state in which a heater system for a pipe is installed in a pipe according to an embodiment of the present disclosure.
Figure 2:
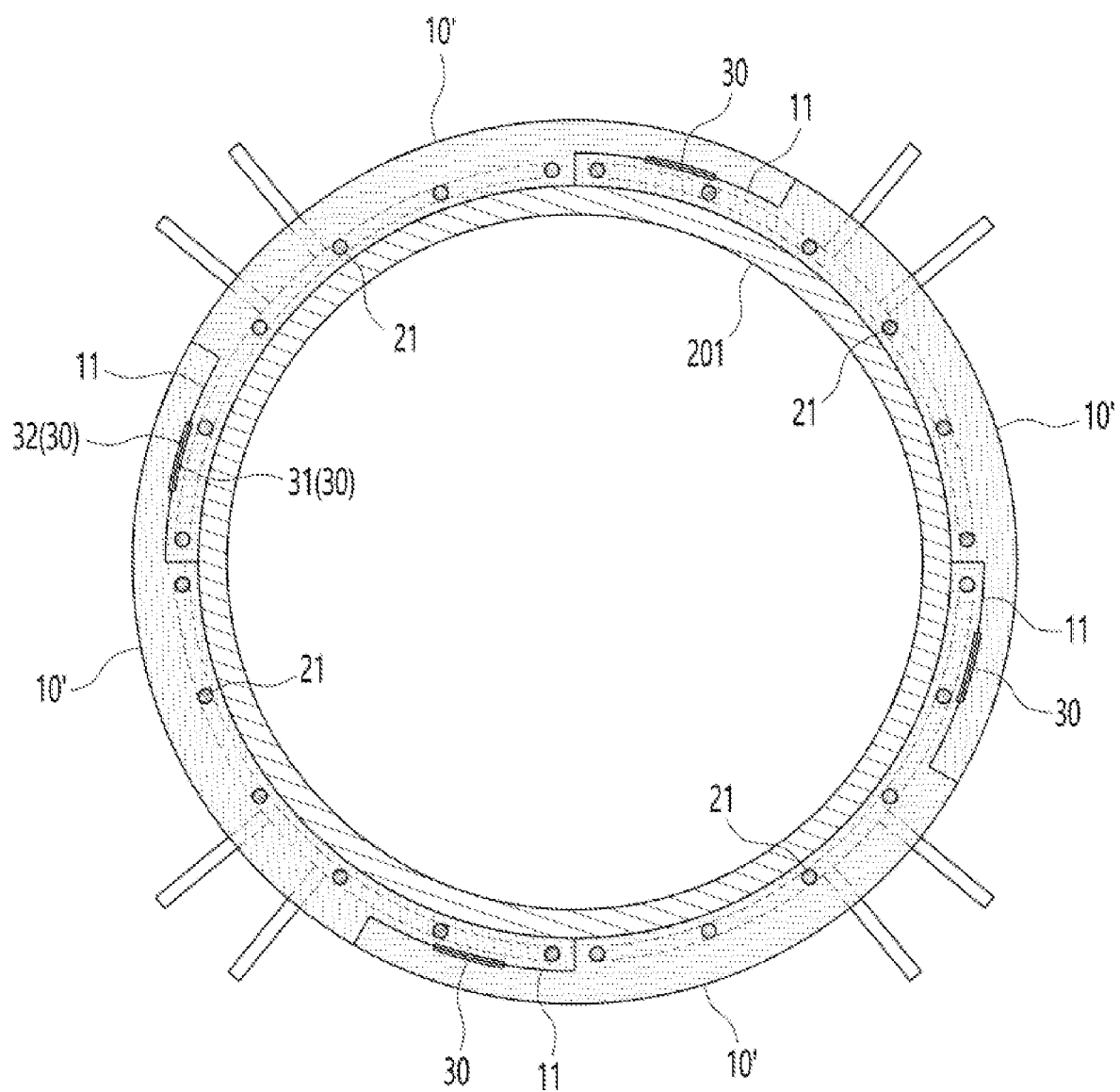
FIG. 2 is a cross-sectional view of a heater system for a pipe according to an embodiment of the present disclosure.
Figure 3:
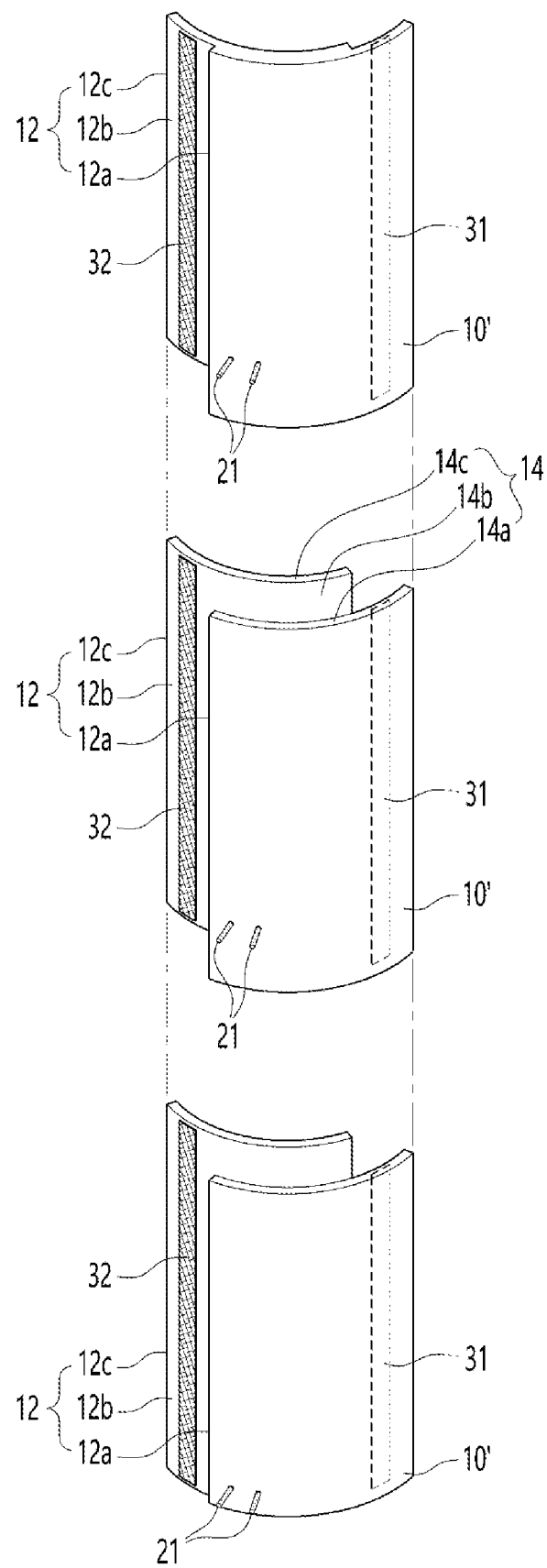
FIG. 3 is a diagram showing a heater body split part of a heater system for a pipe according to an embodiment of the present disclosure.
Figure 4:
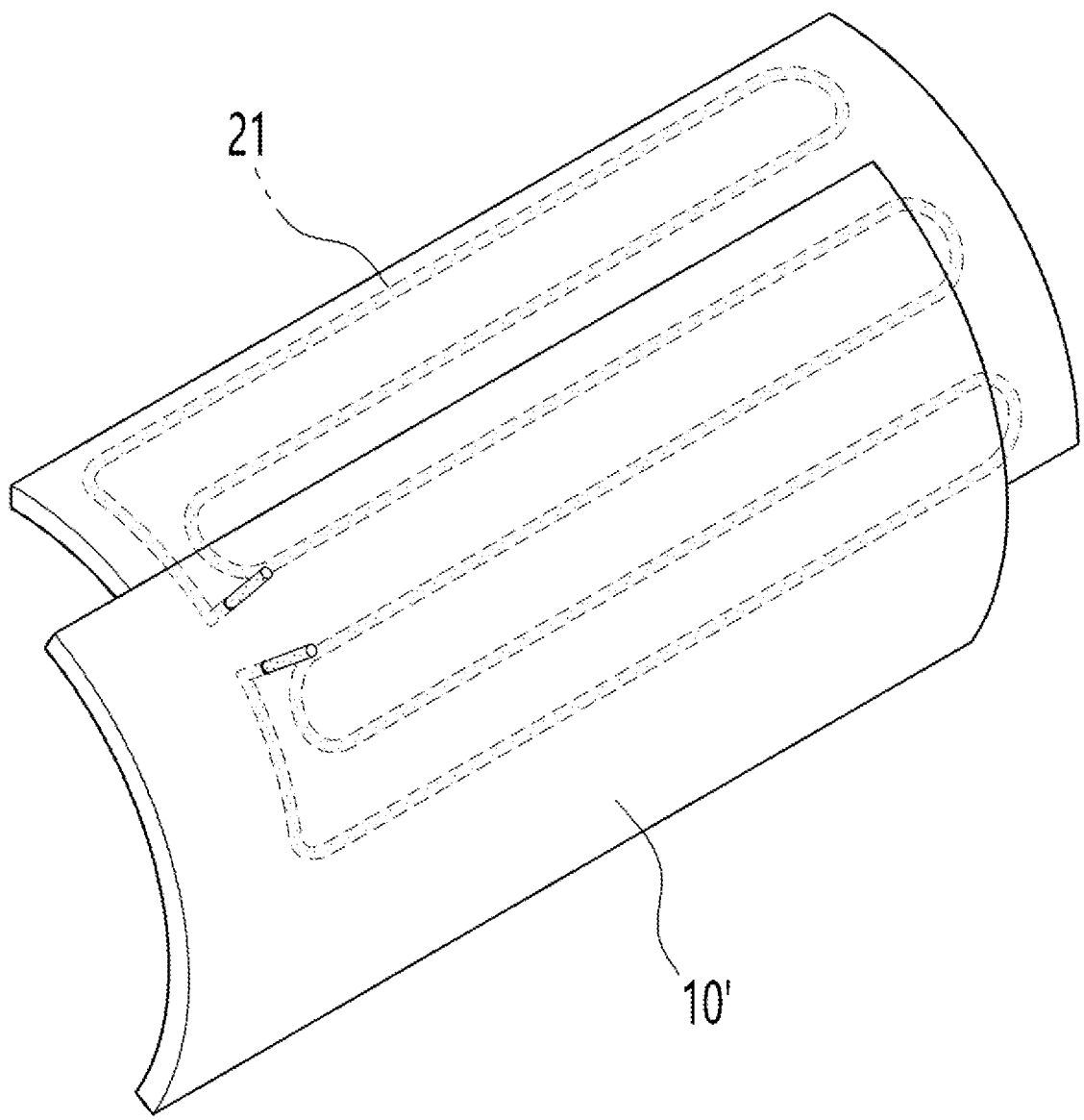
FIG. 4 is a diagram showing a pattern of a heating line according to an embodiment of the present disclosure.
Figure 5:
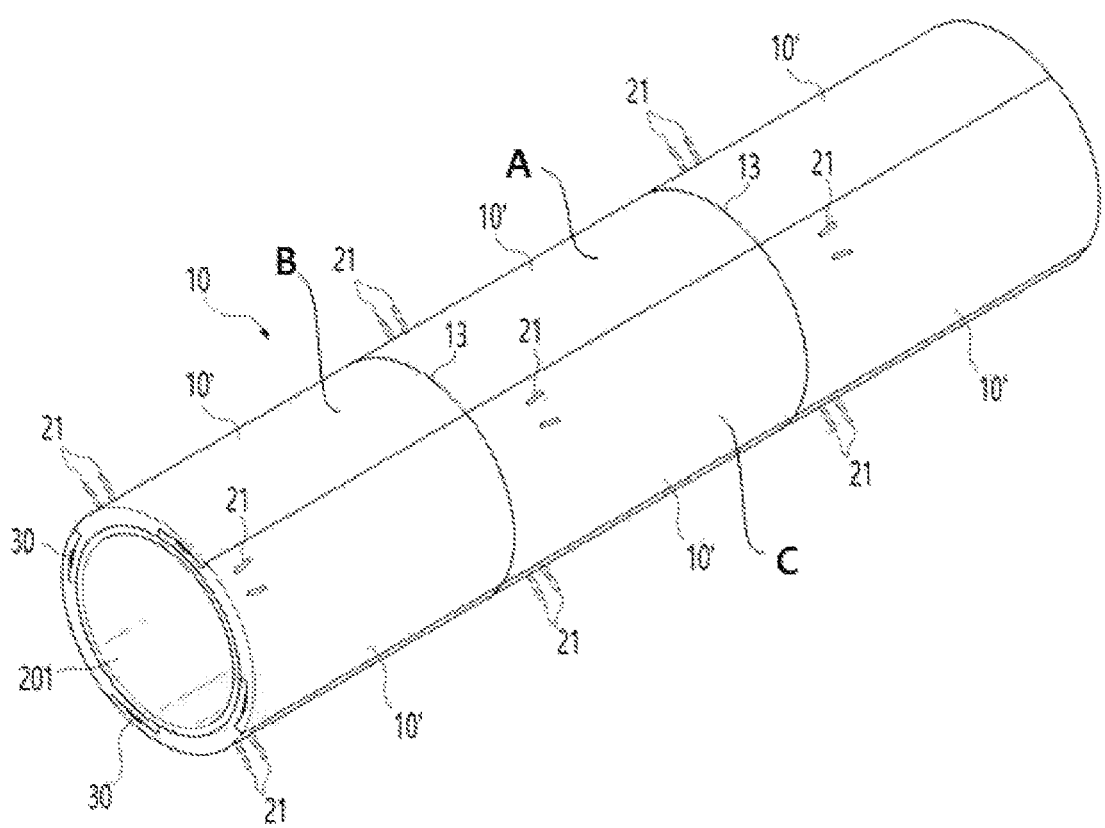
FIG. 5 is a diagram showing a heater system for a pipe which will be referred to for explaining a method of presetting a compensation value of current of single failure of a heating element according to an embodiment of the present disclosure.
Figure 6:
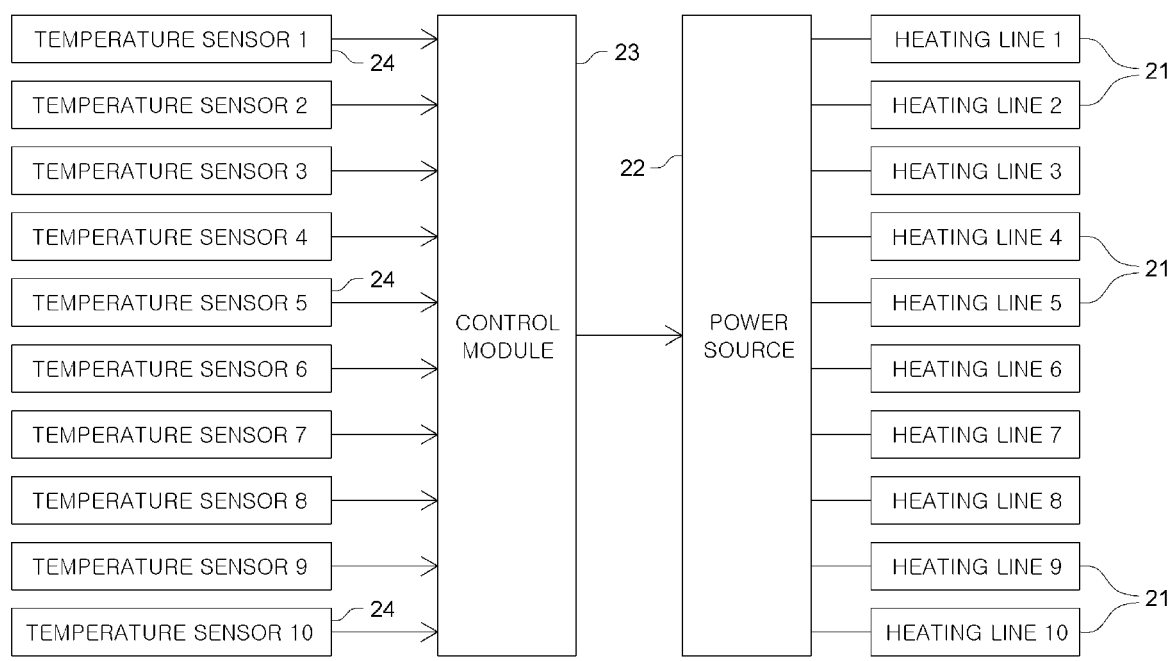
FIG. 6 is a control block diagram according to an embodiment of the present disclosure.
Figure 7:
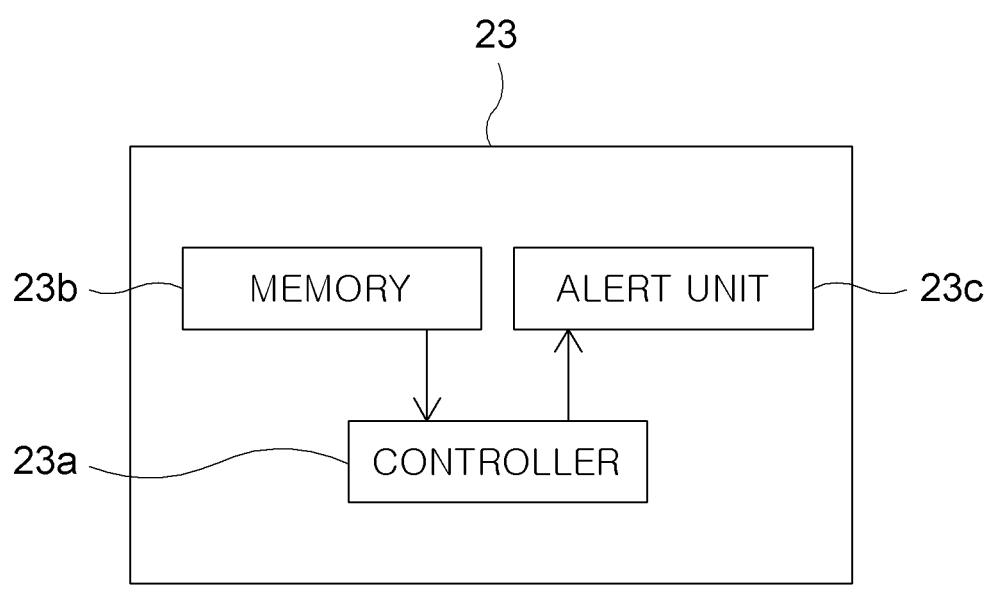
FIG. 7 is a block diagram for each function of a control module shown in FIG. 6.

Hereinafter, exemplary embodiments of the present disclosure will be described in more detail with reference to the accompanying drawings. FIG. 1 is a diagram showing the state in which a heater system for a pipe is installed in a pipe according to an embodiment of the present disclosure. FIG. 2 is a cross-sectional view of a heater system for a pipe according to an embodiment of the present disclosure. FIG. 3 is a diagram showing a heater body split part of a heater system for a pipe according to an embodiment of the present disclosure. FIG. 4 is a diagram showing a pattern of a heating line according to an embodiment of the present disclosure. FIG. 5 is a diagram showing a heater system for a pipe which will be referred to for explaining a method of presetting a compensation value of current of single failure of a heating element according to an embodiment of the present disclosure. FIG. 6 is a control block diagram according to an embodiment of the present disclosure. FIG. 7 is a block diagram for each function of a control module shown in FIG. 6.

As shown in FIGS. 1 to 7, a heater system for a pipe according to an embodiment of the present disclosure may include a heater body part 10 configured in the form of a pipe, a heating line 21 installed in the heater body part 10, a confinement and manipulation part 30 installed in the heater body part 10, a temperature sensor 24 installed at the heater body part 10, a power source 22 connected to the heating line 21, and a control module 23 including a controller 23a for controlling current supplied to the heating line 21 from the power source 22 based on the detection value of the temperature sensor 24.

The heater body part 10 may be fabricated using a flexible material such as silicon rubber. The heating line 21 may be embedded in the heater body part 10 using an insert method when the heater body part 10 is fabricated.

Four longitudinal cutting lines 11 and two circumferential cutting lines 13 may be formed over the entire thickness of the heater body part 10.

One pair of longitudinal cutting planes 12 may be formed over the entire longitudinal section by each longitudinal cutting line 11.

Each longitudinal cutting plane 12 may include a longitudinal external cutting region 12a disposed in a thickness direction from an outer surface of the heater body part 10, a longitudinal intermediate cutting region 12b extending in a circumferential direction of the heater body part 10 from the longitudinal external cutting region 12a, and a longitudinal internal cutting region 12c that extends to reach the inner surface of the heater body part 10 in a thickness direction of the heater body part 10 from the longitudinal intermediate cutting region 12b.

One pair of circumferential cutting planes 14 may be formed over the entire circumferential section by each circumferential cutting line 13.

Each of the circumferential cutting planes 14 may include a circumferential external cutting region 14a disposed in a thickness direction from the outer surface of the heater body part 10, a circumferential intermediate cutting region 14b extending in a longitudinal direction of the heater body part 10 from the circumferential external cutting region 14a, and a circumferential internal cutting region 14c that extends to reach the inner surface of the heater body part 10 in a thickness direction of the heater body part 10 from the circumferential intermediate cutting region 14b.

The heater body part 10 may be divided in a circumferential direction by the four longitudinal cutting lines 11, and the heater body part 10 may be divided in a longitudinal direction by the two circumferential cutting lines 13. Hereinafter, for convenience of description, each piece of the heater body part divided by the longitudinal cutting lines 11 and the circumferential cutting lines 13 will be referred to as a heater body split part 10'.

The heater body split part 10' may be separately installed one by one on the outer surface of the pipe 201 or the plurality of heater body split parts 10' may be installed on the outer surface of the pipe 201 when coupled to each other through the plurality of confinement and manipulation parts 30.

Each of the heating lines 21 may be installed one by one inside the heater body split part 10' to expose opposite ends thereof out of the heater body split part 10'. The heating line 21 may be installed more inwardly than the longitudinal intermediate cutting region 12b.

Each heating line 21 may be electrically connected to the power source 22 for a resistance heating operation.

The heating line 21 may be connected in parallel to the power source 22.

The temperature sensor 24 may be installed one by one in the heater body split part 10'.

The control module 23 may have a memory 23b and an alert unit 23c in addition to the controller 23a.

The memory 23b may be provided one by one in the heater body split part 10'.

The memory 23b may store a preset falling temperature value of single failure of a heating element, a compensation value of current of single failure of a heating element, and a preset compensation value of current of double failure of a heating element.

A method of presetting the falling temperature value of single failure of a heating element, the compensation value of current of single failure of a heating element, and the compensation value of current of double failure of a heating element will be described below with reference to FIG. 5.

1) The falling temperature value of single failure of a heating element may be preset using the following method.

First, currents having the same amplitude (normal current of a heating element) may flow in heating lines belonging to all heater body split parts including a heater body split part "A". The amplitude of the normal current of a heating element may be selected in such a way that the temperature of all of the heater body split parts including the heater body split part "A" is greater than a target temperature value of a pipe.

Then, the normal current of a heating element may flow until the temperature of all of the heater body split parts including the heater body split part "A" stops increasing, and then, the temperature of the heater body split part "A" (the normal temperature of the heater body split part "A") may be detected (S1).

Then, normal current of a heating element flowing in heating lines belonging to a heater body split part "B" disposed around the heater body split part "A" may be interrupted.

Then, when the temperature of the heater body split part "A" stops being lowered, the temperature of the heater body split part "A" (the temperature of single failure of the separation part) may be detected (S2).

Then, a difference between the normal temperature of the heater body split part "A" detected in operation S1 and the temperature of single failure of the separation part of the heater body split part "A" detected in operation S2 may be determined as the falling temperature value of single failure of a heating element.

2) The compensation value of current of single failure of a heating element may be preset using the following method.

First, currents having the same amplitude (the current of single failure of a heating element) may flow in heating lines belonging to the remaining heater body split parts (which include the heater body split part "A") except for the heater body split part "B". The amplitude of the current of single failure of a heating element may be selected in such a way that the temperature of all of remaining heater body split parts (which includes the heater body split part "A") except for the heater body split part "B" is greater than the target temperature value of the pipe.

Then, a difference between the current of single failure of a heating element and the normal current of a heating element may be determined as the compensation value of current of single failure of a heating element.

3) The compensation value of current of double failure of a heating element may be preset using the following method.

First, currents having the same amplitude (the current of double failure of a heating element) may flow in heating lines belonging to the remaining heater body split parts (which include the heater body split part "A") except for the heater body split part "B" and the heater body split part "C". The amplitude of the current of double failure of a heating element may be selected in such a way that the temperature of all of remaining heater body split parts (which includes the heater body split part "A") except for except for the heater body split part "B" and the heater body split part "C" is greater than the target temperature value of the pipe.

Then, a difference between the current of double failure of a heating element and the current of single failure of a heating element may be determined as the compensation value of current of double failure of a heating element.

The alert unit 23c may be a buzzer, a light-emitting diode, or the like.

The controller 23a may be provided one by one in the heater body split part 10'.

The controller 23a may control the power source 22 to increase the amplitude of current flowing in the heating line 21 as follows based on the detection value of the temperature sensor 24, and the falling temperature value of single failure of a heating element, the compensation value of current of single failure of a heating element, and the compensation value of current of double failure of a heating element which are stored in the memory 23b. The power source 22 may be embodied using a conventionally well-known power facility such as an inverter.

First, the controller 23a may control the power source 22 to increase the amplitude of current flowing in the heating line 21 by as much as the compensation value of current of single failure of a heating element when a lowered temperature value of the heater body split part 10' becomes greater than the falling temperature value of single failure of a heating element. The lowered temperature value of the heater body split part 10' becomes greater than the falling temperature value of single failure of a heating element when a heating operation of an adjacent heater body split part 10' stops. The heating operation of the heater body split part 10' may stop for the reason, e.g., failure of the controller 23a, disconnection of the heating line 21, or disconnection of the temperature sensor 24.

The controller 23a may operate the alert unit 23c when the lowered temperature value of the heater body split part 10' becomes greater than the falling temperature value of single failure of a heating element.

Then, the controller 23a may control the power source 22 to increase the amplitude of current flowing in the heating line 21 by as much as the compensation value of current of single failure of a heating element, and then, when the temperature of the heater body split part 10' does not increase by as much as the falling temperature value of single failure of a heating element, the controller 23a may control the power source 22 to additionally increase the amplitude of current flowing in the heating line 21 by as much as the compensation value of current of double failure of a heating element.

The amplitude of current flowing in the heating line 21 is increased by as much as the compensation value of current of single failure of a heating element but the temperature of the heater body split part 10' does not increase by as much as the falling temperature value of single failure of a heating element when the heating operation in two or more adjacent heater body split parts 10' stops.

The confinement and manipulation part 30 may include a female velcro tape 32 and a male velcro tape 31 that are installed on the heater body split part 10' to face each other in the longitudinal intermediate cutting region 12b.

The female velcro tape 32 and a male velcro tape 31 may be installed one by one in each heater body split part 10'.

When the female velcro tape 32 and the male velcro tape 31 come into contact with each other, the one pair of longitudinal cutting planes 12 may be confined not to be spaced apart from each other.

Figure 8:
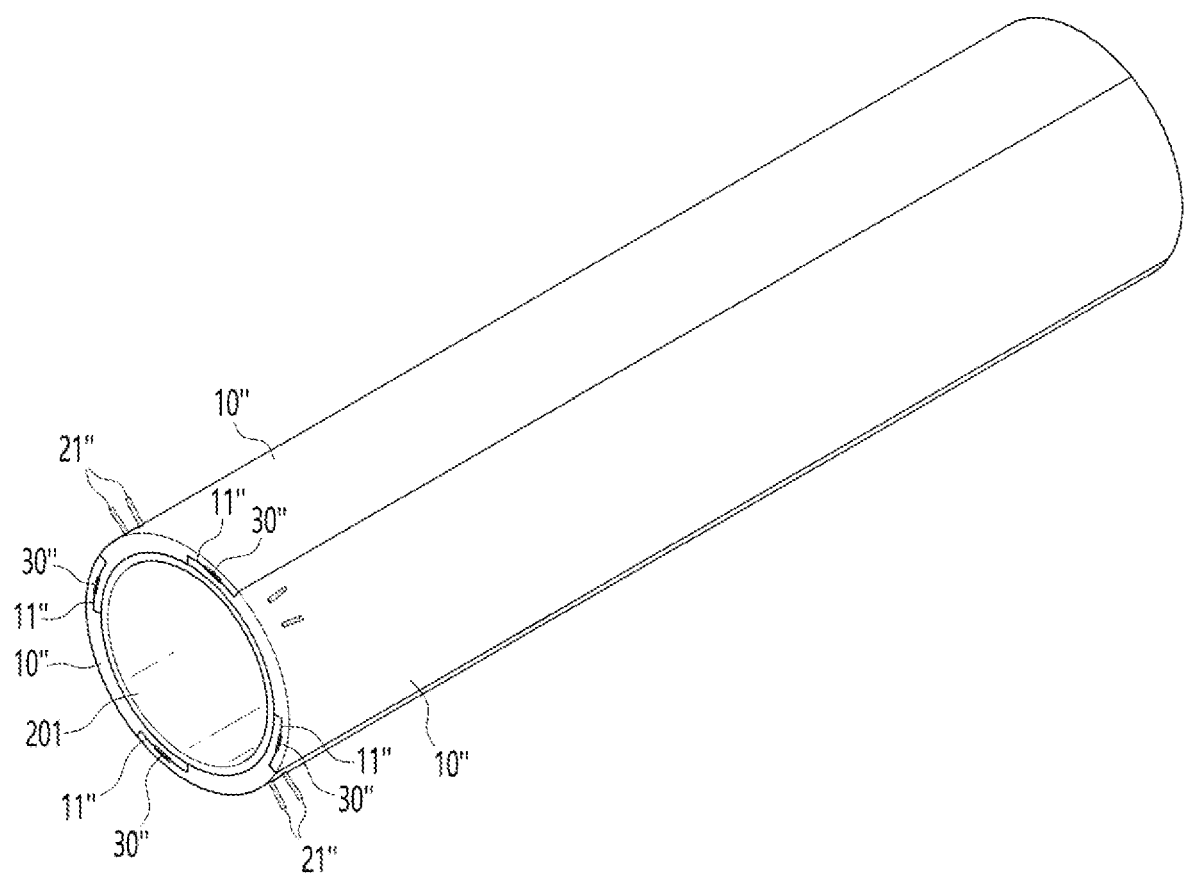
FIG. 8 is a diagram showing the state in which a heater system for a pipe is installed in a pipe according to another embodiment of the present disclosure.
Figure 9:
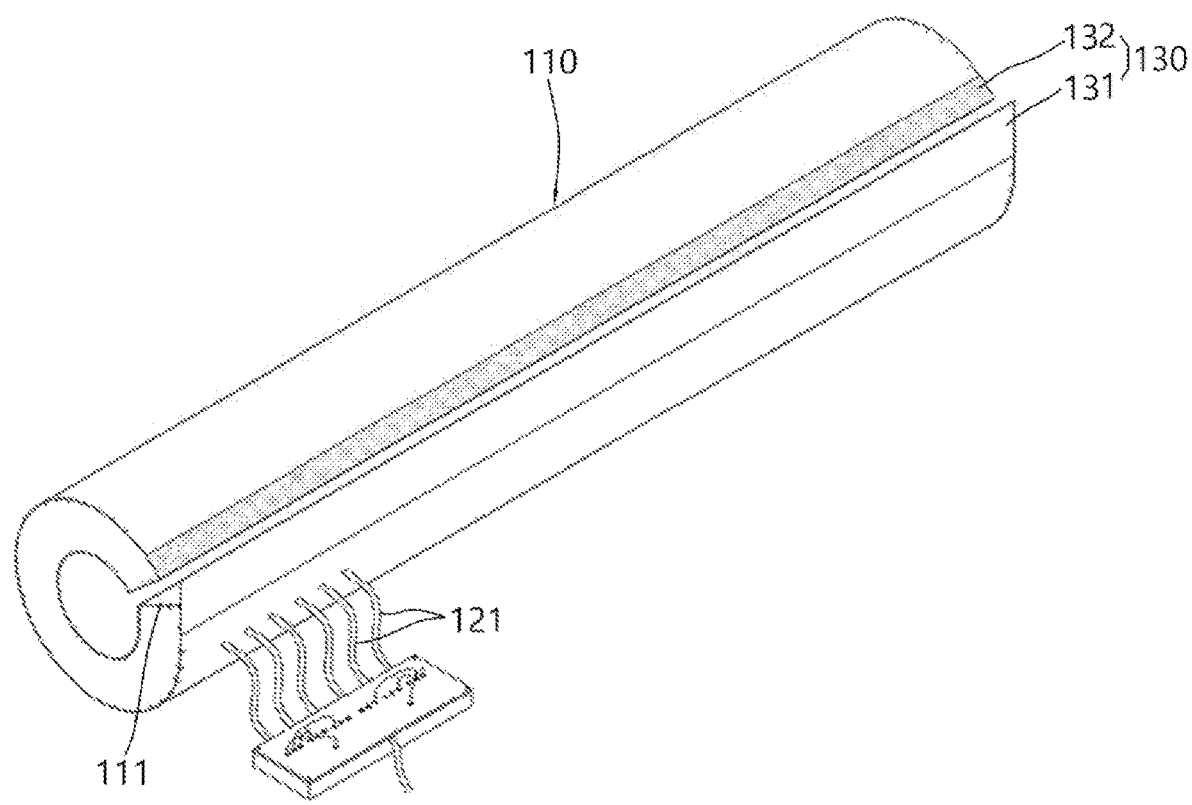
FIG. 9 is a perspective view of a conventional heater system for a pipe.
Figure 10:
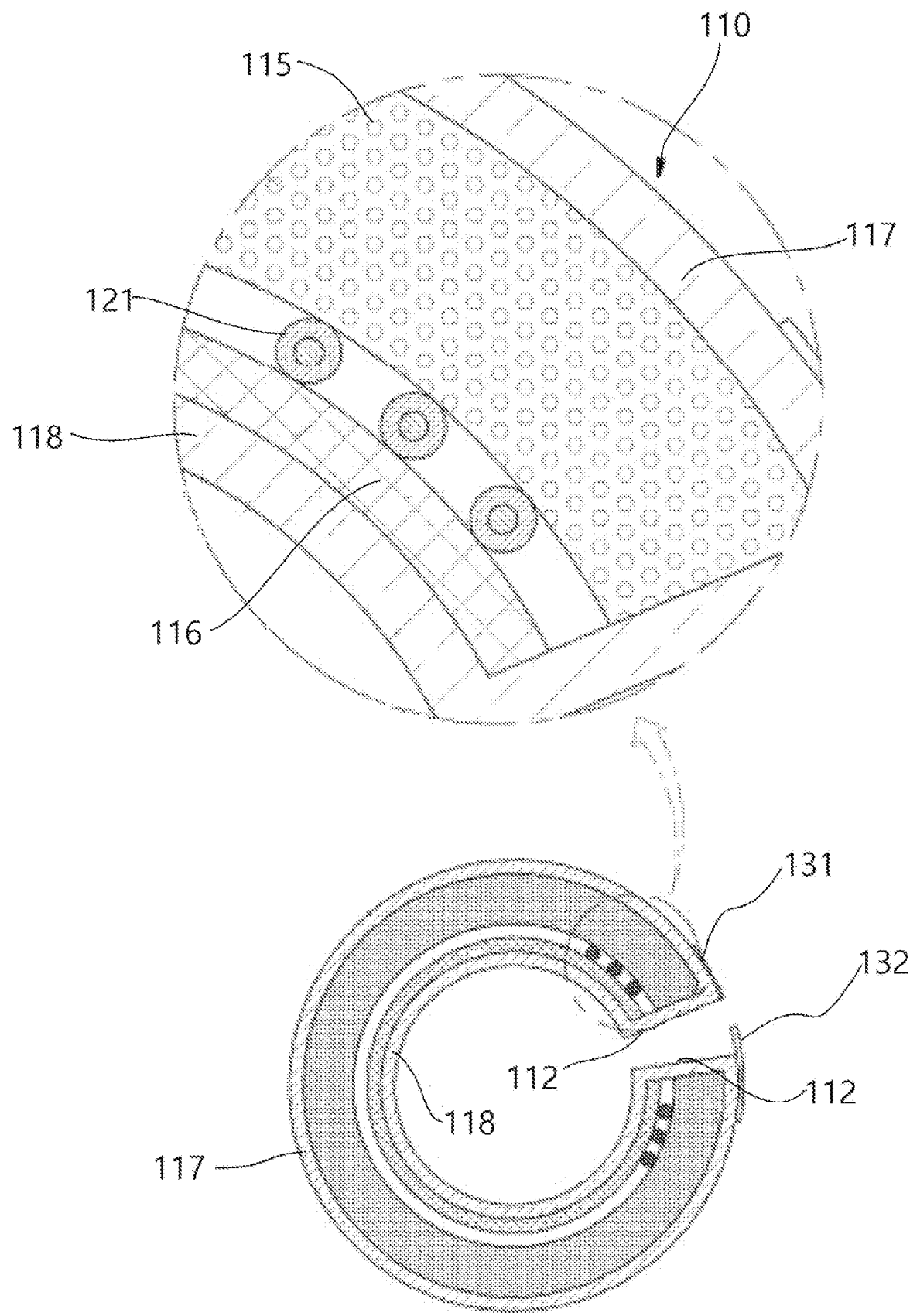
FIG. 10 is a cross-sectional view of a conventional heater system for a pipe.
Figure 11:
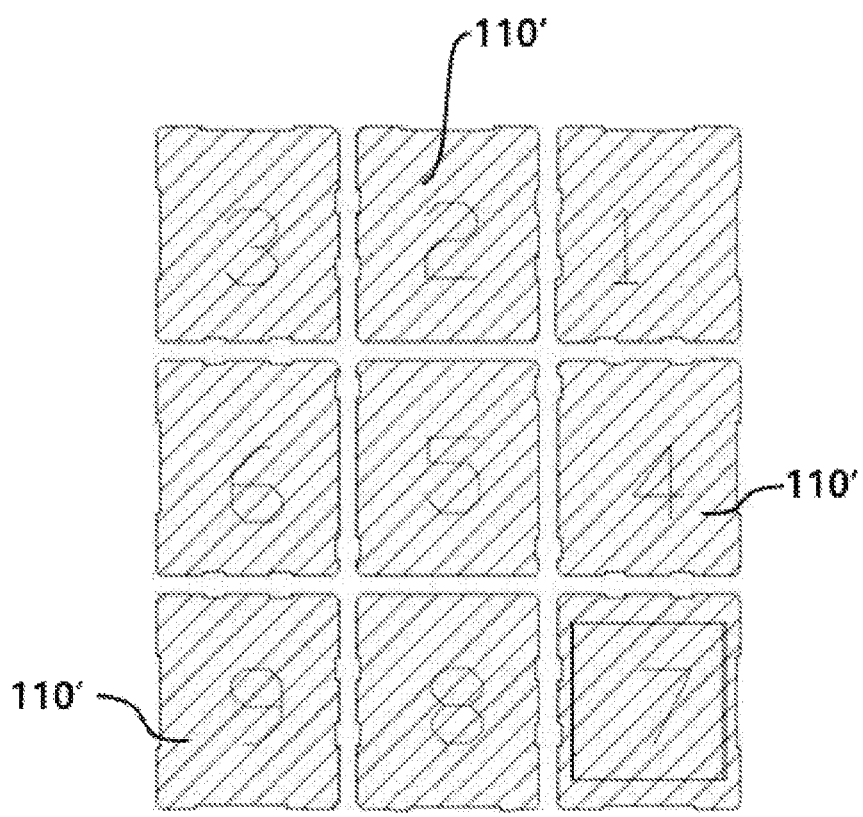
FIG. 11 is a diagram showing the state in which a heater body part is divided of another conventional heater system.
Figure 12:
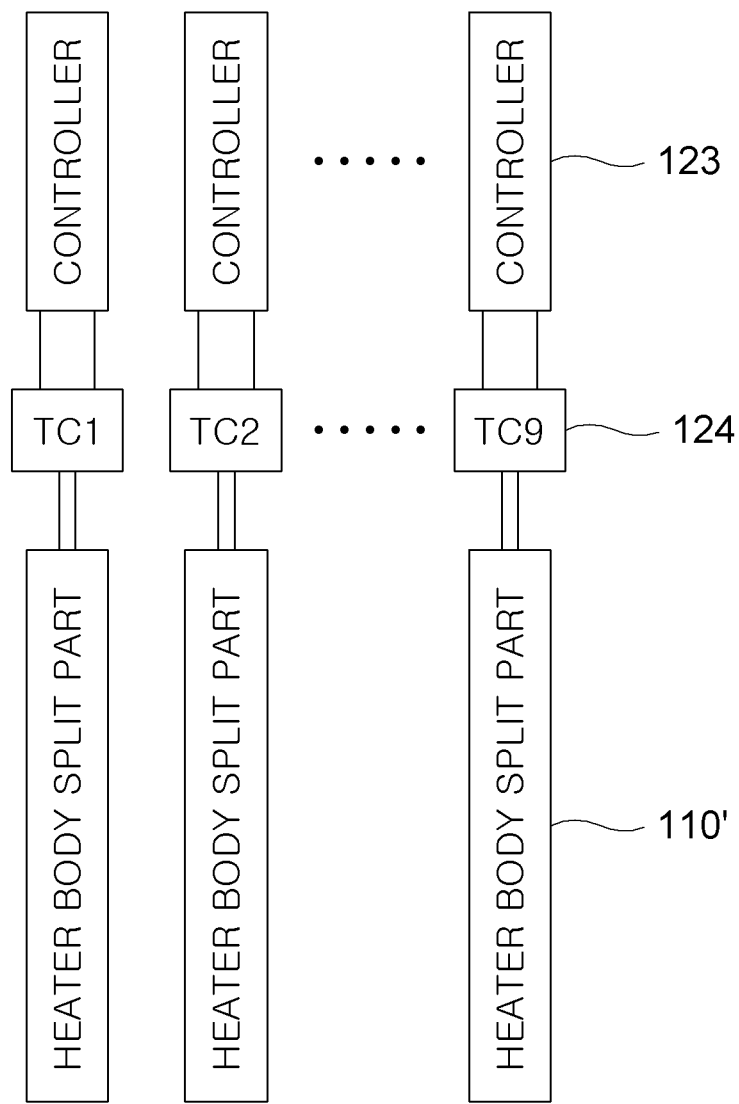
FIG. 12 is a control block diagram of another conventional heater system for a pipe.

In the aforementioned embodiment, although the heater body part 10 is divided by the plurality of longitudinal cutting lines 11 and the plurality of circumferential cutting lines 13, the present disclosure may be implemented by dividing the heater body part 10 only by the plurality of longitudinal cutting lines 11 without formation of the circumferential cutting lines 13, as shown in FIG. 8.

FIG. 8 is a diagram showing the state in which a heater system for a pipe is installed in a pipe according to another embodiment of the present disclosure.

The heater system for a pipe according to another embodiment of the present disclosure may be different from the heater system for a pipe according to an embodiment of the present disclosure (the heater body part is divided by four longitudinal cutting lines and two circumferential cutting lines cutting lines) in that the heater system for a pipe according to another embodiment of the present disclosure is configured in such a way that the heater body part is divided by the four longitudinal cutting lines 11".

The one pair of longitudinal cutting planes 12 (refer to FIG. 3) may be formed over the entire longitudinal section by each longitudinal cutting line 11".

Each longitudinal cutting plane may include the longitudinal external cutting region 12a (refer to FIG. 3) disposed in a thickness direction from the outer surface of the heater body part, the longitudinal intermediate cutting region 12b (refer to FIG. 3) extending in a circumferential direction of the heater body part from the longitudinal external cutting region, and the longitudinal internal cutting region 12c (refer to FIG. 3) that extends to reach the inner surface of the heater body part in a thickness direction of the heater body part from the longitudinal intermediate cutting region.

The heater body part may be divided in a circumferential direction by the plurality of longitudinal cutting lines 11". For convenience of description, each piece of the heater body part divided by the longitudinal cutting lines 11" will be referred to as a heater body split part 10".

A heating line 21" may be installed one by one inside each heater body split part 10" to expose opposite ends thereof out of the heater body part.

A confinement and manipulation part 30" may include the female velcro tape 32 (refer to FIG. 3) and the male velcro tape 31 (refer to FIG. 3) which are installed in the longitudinal intermediate cutting region.

In the aforementioned embodiment, although the heater body part is divided by the plurality of longitudinal cutting lines, the present disclosure may be implemented by dividing the heater body part by at least one circumferential cutting line while forming one longitudinal cutting line.

As described above, according to an embodiment of the present disclosure, the memory 23b provided one by one in the heater body split part 10' may store the preset falling temperature value of single failure of a heating element and the compensation value of current of single failure of a heating element, and the controller 23a provided one by one in the heater body split part 10' may control the power source 22 to increase the amplitude of current flowing in the heating line 21 by as much as the compensation value of current of single failure of a heating element when the lowered temperature value of the heater body split part 10' becomes greater than the falling temperature value of single failure of a heating element, and accordingly, the target temperature value of the pipe in the remaining region except for an installation region of the heater body split part 10', a heating operation of which is stopped, may be maintained using a simple control operation on each heater body split part 10'.

In addition, the memory 23b may additionally store the preset compensation value of current of double failure of a heating element, and the controller 23a may control the power source 22 to increase the amplitude of current flowing in the heating line 21 by as much as the compensation value of current of single failure of a heating element and may then control the power source 22 to additionally increase the amplitude of current flowing in the heating line 21 by as much as the compensation value of current of double failure of a heating element when the temperature of the heater body split part 10' does not increase by as much as the falling temperature value of single failure of a heating element, and accordingly, the target temperature value of the pipe in the remaining region except for an installation region of the heater body split part 10' may be maintained using a simple control operation on each heater body split part 10' when the heating operation of the two heater body split parts 10' stops.

Information indicating that the heating operation of at least one of the heater body split parts 10' stops may be signaled to a user by operating the alert unit 23c when the lowered temperature value of the heater body split part 10' becomes greater than the falling temperature value of single failure of a heating element.

Heat loss between the one pair of longitudinal cutting planes 12 may decrease and the lowered temperature value in the installation region of the heater body split part 10', a heating operation of which is stopped, may be reduced by forming the longitudinal cutting planes 12 including the longitudinal external cutting region 12a disposed in the thickness direction from the outer surface of the heater body part 10 by the longitudinal cutting lines 11, the longitudinal intermediate cutting region 12b extending in the circumferential direction of the heater body part 10 from the longitudinal external cutting region 12a, and the longitudinal internal cutting region 12c that extends to reach the inner surface of the heater body part 10 in the thickness direction of the heater body part 10 from the longitudinal intermediate cutting region 12b. Heat loss between the one pair of longitudinal cutting planes 12 may decrease because a contact area between the one pair of longitudinal cutting planes 12 is increased due to a large size of each longitudinal cutting plane 12 when confined by the confinement and manipulation part 30, and it is difficult to move heat between the one pair of longitudinal cutting planes 12 since there are two bent portions in the longitudinal cutting planes 12. In addition, when the lowered temperature value in an installation region of the heater body split part 10', the heating operation of which is stopped, may be reduced because an overlap region is present between the heater body split part 10', the heating operation of which is sopped, and the heater body split part 10', the heating operation of which is normally performed.

When heat loss between the one pair of longitudinal cutting planes 12 decreases, the uniformity of the temperature of an outer surface of a pipe 201 may be improved, and the heating line 21 may be installed adjacently to the longitudinal cutting planes 12.

Heat loss between the one pair of circumferential cutting planes 14 may decrease and the lowered temperature value in the installation region of the heater body split part 10' a heating operation of which is stopped, may be reduced by forming the circumferential cutting planes 14 including the circumferential external cutting region 14a disposed in the thickness direction from the outer surface of the heater body part 10 by the circumferential cutting lines 13, the circumferential intermediate cutting region 14b extending in the longitudinal direction of the heater body part 10 from the circumferential external cutting region 14a, and the circumferential internal cutting region 14c that extends to reach the inner surface of the heater body part 10 in the thickness direction of the heater body part 10 from the circumferential intermediate cutting region 14b.

Accordingly, according to the present disclosure, the memory provided one by one in the heater body split part may store the preset falling temperature value of single failure of a heating element and the compensation value of current of single failure of a heating element, and the controller provided one by one in the heater body split part may control the power source to increase the amplitude of current flowing in a heating line by as much as the compensation value of current of single failure of a heating element when the lowered temperature value of the heater body split part becomes greater than the falling temperature value of single failure of a heating element, and accordingly, the target temperature value of the pipe in the remaining region except for an installation region of the heater body split part, a heating operation of which is stopped, may be maintained using a simple control operation on each heater body split part.

The above-described exemplary embodiments may be variously modified, and all or some of the exemplary embodiments may be selectively combined with each other. Further, the exemplary embodiments in the present specification are only for description, and are not limitative. In addition, it is to be understood by those skilled in the art to which the present disclosure pertains that various modifications may be made without departing from the scope of the technical idea of the present disclosure.

What is claimed is:

1. A heater system for a pipe, comprising:
   a heater body part including a plurality of heater body split parts on which a longitudinal cutting plane and a circumferential cutting plane are formed, and each of the heater body split parts having a heating line installed therein;
   a power source connected in parallel to the heating lines;
   a confinement and manipulation part configured to confine the heater body part in a cylindrical form;
   a plurality of temperature sensors installed in the heater body split parts, respectively, and configured to measure temperature values of the heater body split parts, and generate measured temperature information based on the measured temperature values; and
   a control module configured to control the power source depending on the measured temperature value from each of the temperature sensors,
   wherein the control module includes:
   a memory configured to store reference temperature information and first failure current compensation information which corresponds to a value of current that compensates for lowered temperature values of a first one of the heater body split parts due to a heating failure thereof; and
   a controller configured to compare the reference temperature information stored in the memory with the measured temperature information, and to control the power source to adjust an internal temperature of the heater body part based on the first failure current compensation information when the measured temperature information is lower than the reference temperature information.

2. The heater system for a pipe of claim 1, wherein the memory additionally stores second failure current compensation information which corresponds to another value of current that compensates for lowered temperature values of a second one of the heater body split parts due to heating failure thereof, and the controller controls the power source based on the first failure current compensation information to heat the heating line and to guide an increase in a temperature inside the heater body part, and then, controls the power source to additionally heat the heating line based on the second failure current compensation information when information on the increased temperature is lower than the reference temperature information.

3. The heater system for a pipe of claim 1, wherein the control module further includes an alert unit, and
   the controller controls the alert unit to operate when the measured temperature value is lower than the reference temperature information.

4. The heater system for a pipe of claim 1, wherein the longitudinal cutting plane includes:
   a longitudinal external cutting region disposed in a thickness direction from an outer surface;
   a longitudinal intermediate cutting region extending in a circumferential direction of the heater body part from the longitudinal external cutting region; and
   a longitudinal internal cutting region extending to reach an inner surface of the heater body part in the thickness direction of the heater body part from the longitudinal intermediate cutting region, and
   the circumferential cutting plane includes:
   a circumferential external cutting region disposed in the thickness direction from the outer surface;
   a circumferential intermediate cutting region extending in a longitudinal direction of the heater body part from a circumferential external cutting region; and
   a circumferential internal cutting region extending to reach the inner surface of the heater body part in the thickness direction of the heater body part from the circumferential intermediate cutting region.

5. The heater system for a pipe of claim 1, wherein the confinement and manipulation part is installed in the longitudinal intermediate cutting region.

6. The heater system for a pipe of claim 1, wherein the confinement and manipulation part includes a female velcro tape and a male velcro tape that are installed to face each other in the longitudinal intermediate cutting region.

7. The heater system for a pipe of claim 1, wherein the heating line is installed more inwardly than the longitudinal intermediate cutting region.

8. The heater system for a pipe of claim 1, wherein the heater body split parts are formed of a flexible material.

9. The heater system for a pipe of claim 1, wherein the control module groups the heating lines of the heater body split parts in a longitudinal direction or a column direction and controls the heating lines to operate.

10. A heater system for a pipe, comprising:
    a heater body part including a plurality of heater body split parts on which a longitudinal direction cutting plane is formed;
    each of the heater body split parts having a heating line installed therein;
    a power source connected in parallel to the heating lines;
    a confinement and manipulation part configured to confine the heater body part in a cylindrical form;
    a plurality of temperature sensors installed in the heater body split parts, respectively, and configured to measure temperature values of the heater body split parts, and generate measured temperature information based on the measured temperature values; and
    a plurality of control modules configured to control the power source depending on the measured temperature value from each of the temperature sensors, each of the plurality of control modules includes:
a memory configured to store reference temperature information and first failure current compensation information which corresponds to a value of current that compensates for lowered temperature values of a single one of the heater body split parts due to a heating failure thereof; and
a controller configured to compare the reference temperature information stored in the memory with the measured temperature information, and to control the power source to adjust an internal temperature of the heater body part based on the first failure current compensation information when the measured temperature information is lower than the reference temperature information.

11. The heater system for a pipe of claim 10, wherein the memory additionally stores second failure current compensation information which corresponds to another value of current that compensates for lowered temperature values of a second one of the heater body split parts due to heating failure thereof, and
the controller controls the power source based on the first failure current compensation information to heat the heating line and to guide an increase in a temperature inside the heater body part, and then, controls the power source to additionally heat the heating line based on the second failure current compensation information when information on the increased temperature is lower than the reference temperature information.

12. The heater system for a pipe of claim 10, wherein the control module further includes an alert unit, and
the controller controls the alert unit to operate when the measured temperature value is lower than the reference temperature information.

13. The heater system for a pipe of claim 10, wherein the longitudinal cutting plane includes:
a longitudinal external cutting region disposed in a thickness direction from an outer surface;
a longitudinal intermediate cutting region extending in a circumferential direction of the heater body part from the longitudinal external cutting region; and
a longitudinal internal cutting region extending to reach an inner surface of the heater body part in the thickness direction of the heater body part from the longitudinal intermediate cutting region.

14. The heater system for a pipe of claim 10, wherein the confinement and manipulation part is installed in the longitudinal intermediate cutting region.

15. The heater system for a pipe of claim 10, wherein the confinement and manipulation part includes a female velcro tape and a male velcro tape that are installed to face each other in the longitudinal intermediate cutting region.

16. The heater system for a pipe of claim 10, wherein the heating line is installed more inwardly than the longitudinal intermediate cutting region.

17. The heater system for a pipe of claim 10, wherein the heater body split parts are formed of a flexible material.

* * * * *

UNITED STATES PATENT AND TRADEMARK OFFICE
CERTIFICATE OF CORRECTION

PATENT NO. : 11,920,719 B2
APPLICATION NO. : 17/119098
DATED : March 5, 2024
INVENTOR(S) : Oh Su Kim and John Ho Kuk Page 1 of 1

It is certified that error appears in the above-identified patent and that said Letters Patent is hereby corrected as shown below:

On the Title Page

Insert -- (30) Foreign Application Priority Data
Jul. 13, 2020 (KR) ... 10-2020-0085884 --

Signed and Sealed this
Eighteenth Day of June, 2024

Katherine Kelly Vidal
*Director of the United States Patent and Trademark Office*